Nov. 7, 1967 J. D. BOSTROM 3,351,264

PACKAGING DEVICE

Filed Oct. 4, 1965 4 Sheets-Sheet 1

INVENTOR.
John Donald Bostrom
BY Michael Kovac
Robert W. Beart
His Att'ys

Nov. 7, 1967 J. D. BOSTROM 3,351,264

PACKAGING DEVICE

Filed Oct. 4, 1965 4 Sheets-Sheet 2

INVENTOR.
John Donald Bostrom
BY Michael Kovac
Robert W. Beart
His Att'ys

Nov. 7, 1967 J. D. BOSTROM 3,351,264

PACKAGING DEVICE

Filed Oct. 4, 1965 4 Sheets-Sheet 3

INVENTOR.
John Donald Bostrom
BY Michael Kovac
Robert W. Beart
His Att'ys

Nov. 7, 1967 J. D. BOSTROM 3,351,264

PACKAGING DEVICE

Filed Oct. 4, 1965 4 Sheets-Sheet 4

INVENTOR.
John Donald Bostrom
BY Michael Kane
Robert W. Beart
His Att'ys

United States Patent Office 3,351,264
Patented Nov. 7, 1967

3,351,264
PACKAGING DEVICE
John Donald Bostrom, Niles, Ill., assignor to Illinois Tool Works Inc., Chicago, Ill., a corporation of Delaware
Filed Oct. 4, 1965, Ser. No. 492,534
3 Claims. (Cl. 229—42)

ABSTRACT OF THE DISCLOSURE

A packaging device interposed between a plurality of pairs of superposed container bodies for separating and maintaining superposed container bodies from each other while preventing lateral shifting of such container bodies.

Various types of container separating devices have heretofore been employed for packing containers in shipping cartons to prevent container damage or breakage caused by rough handling, and for utilizing the space in shipping cartons as much as possible which would not be possible by random packaging. The proposals advanced by the prior art have ranged from a single paperboard sheet placed between superposed containers to a foamed thermoplastic divider, the most common form being a paperboard divider having interfitting parts which are so arranged to provide separate container receiving compartments.

While such devices may be satisfactory for one or more requirements, they are not readily adaptable to a variety of situations. The single paperboard sheet, while separating upper and lower layers of containers, does not prevent lateral shifting of stacked containers; the foamed thermoplastic divider usually requires a great deal of space itself, is relatively costly, and may consist of several parts; and the interfitting paperboard divider while also consisting of several parts, does not, unless used with a paperboard sheet, protect upper and lower superposed containers from each other. Furthermore, none of the prior art devices have been capable of absorbing shocks occasioned by rough handling of the shipping cartons, and at the same time permit subsequent usage in stacking and separating containers on a display shelf.

Accordingly, it is an object of the present invention to provide a new and improved container stacking and separating device for a plurality of pairs of superposed containers.

Another object of the present invention is the provision of a container stacking and separating device of the aforementioned type which holds containers securely against shifting relative to one another while permitting unimpeded placement and removal of containers from the device.

A further object of the present invention is the provision of a one piece container stacking and separating device of the foregoing type which is formed from sheet material, preferably relatively thin thermoplastic material by economical, mass production techniques.

Still another object is the provision of a packaging device of the foregoing type which is usable in a shipping carton, and also on a display shelf with equal facility.

With the development of thin gage metallic containers which have no peripheral bead adjacent the lower end of the containers, a further problem has been created. Unless extreme care is exercised in stacking and handling such containers, the beaded upper end of one container can readily damage or deform the smooth wall surface adjacent the lower end of a superposed container. As a result, prospective purchasers may be discouraged from buying products packaged in such containers on the assumption that there is something wrong with the contents thereof.

Therefore, it is a further object of the present invention to provide a container stacking and separating device which, in addition to the aforementioned objects, eliminates or at least reduces the dimensional differences in the upper and lower ends of a pair of such containers superposed upon one another to restrict lateral shifting therebetween and prevent container damage, deformation and the like.

A still further object of the present invention is the provision of a container stacking and separating device which is comparative from a price standpoint with other prior art proposals and developments.

Other and further objects and advantages will become apparent from the following description when read in connection with the accompanying drawings wherein.

Before discussing the present invention in detail, it is to be understood that the term "containers" as used herein covers any receptacle made from any suitable material, and of any size or shape. The containers are, however, preferably of the metallic container variety having beaded upper ends or beaded upper and lower ends. The packaging device discussed in the description that follows is to be considered with this preference in mind, recognizing that any container coming within the above definition may be used. It is also to be understood that each form or embodiment of packaging device hereafter disclosed is illustrated for use with containers of the same size, shape, etc., but that it is possible to modify the packaging device to permit stacked separation of a plurality of pairs of dissimilarly configured containers if this is desired.

Figure 1:
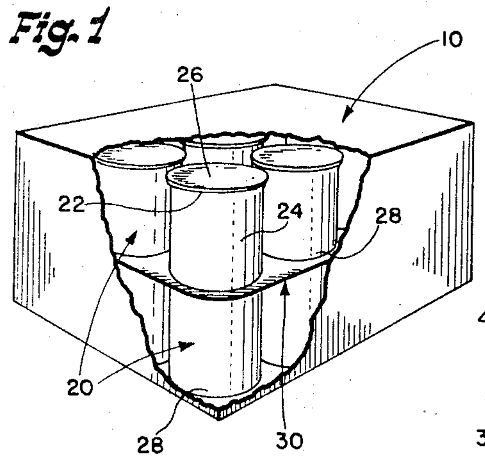
FIG. 1 is a perspective view of a shipping carton showing a plurality of pairs of superposed containers which are separated and stacked relative to one another by the packing device of the present invention.
Figure 2:
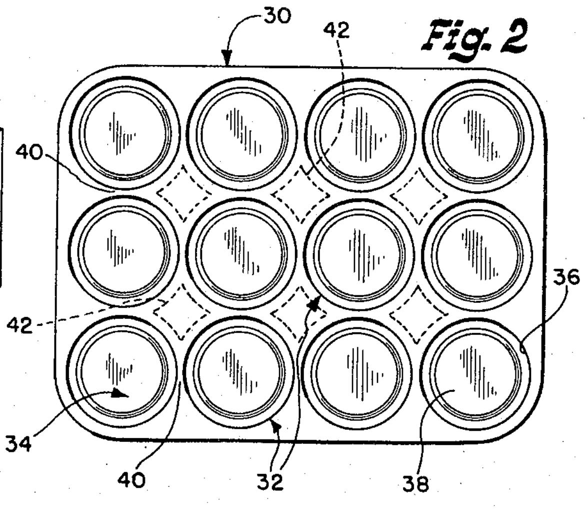
FIG. 2 is a top plan view of the packaging device shown in FIG. 1 of the drawings.
Figure 3:
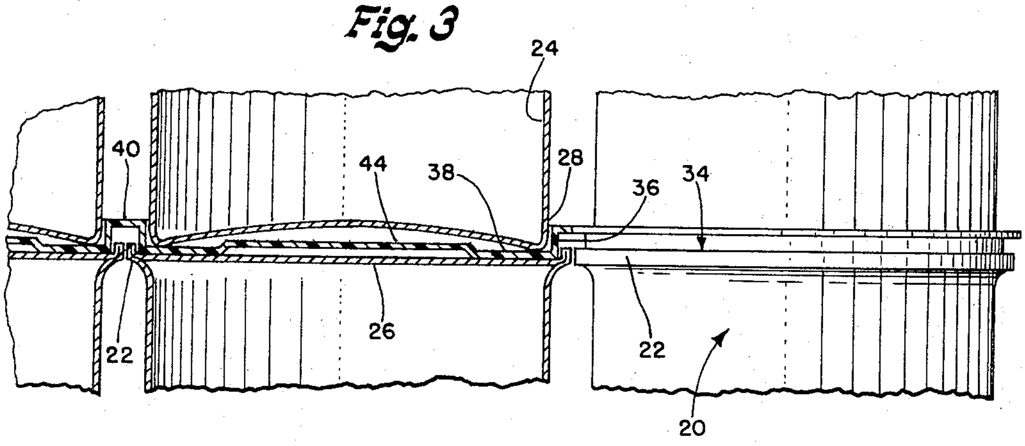
FIG. 3 is an enlarged fragmentary side elevational view, partly in section, of a plurality of superposed containers with the form of packaging device illustrated in FIG. 2 interposed therebetween.

With the above in mind, reference is now made to the drawings, and first to FIGS. 1–3 thereof. The most significant use for the packaging or the stacking and separating device of the present invention is in separating containers packed in a shipping container designated 10 in FIG. 1 of the drawings. As is customary, the shipping carton 10 includes a plurality of containers 20 arranged in superposed pairs for economy of space. To maintain the containers in each superposed pair and adjacent pairs of superposed containers in predetermined, relatively close but non-engaging positions with respect to each other, the packaging device 30 is provided.

Each of the containers 20 is of the thin gage metallic variety having only an upper beaded rim 22 which is created by the conventional joining of the container body 24 and top 26 to each other. The body 24 is formed in one piece from a web of material by suitable drawing techniques which have recently been developed. The curling or rolling of the outer peripheral portions of the container body 24 adjacent its open mouth to the outer peripheral areas of the top 26 to form the beaded rim 22 is well known, and discussion is thus unnecessary.

When containers 20 of this type are stacked one above the other in superposed relationship, the smooth wall surface 28 adjacent the lower end of each uppermost container is of a predetermined smaller peripheral size than the internal peripheral dimension of the upstanding peripheral bead 22 on a lowermost container, and thus the lower end of the uppermost container is readily received within the upstanding peripheral bead of the lowermost container in each superposed pair of containers. The relative difference in dimension is such that lateral shifting of each superposed container with respect to one another, such as would occur in a shipping carton 10, will deform or damage the smooth wall lower surface 28, and possibly other parts of the containers 20 if tilted or canted relative to each other. It is not only important for each container in a superposed pair to be held in non-shifting, predetermined locations, but adjacent pairs of superposed containers should be separated from one another also. Otherwise, damage or deformation of the containers will readily occur, thus discouraging purchases by consumers.

The packaging or the stacking and separating device 30 achieves this, while also affording several other important advantages which will appear in the discussion that follows. The packaging device 30, in its preferred form, comprises an elongated, flat body of thermoplastic material, such as polystyrene, polyethylene and the like, but also can be made from paperboard and other sheet materials or various combinations of the same as will be apparent. As seen in FIG. 2, the packaging device 30 has a plurality of container receiving areas or compartments 32 which are preferably arranged in three parallel rows of four compartments each to provide some twelve container receiving compartments. A packaging device 30 of this type will be capable of receiving in stacked, separated relationship some twenty-four containers.

As best seen in FIG. 3, each of the container receiving areas 32 comprises a closed pocket 34 which extends downwardly from the upper, generally planar area of the body, each pocket having a peripherally continuous side wall 36 which is integrally joined at the lower end to a bottom wall portion 38. The outer peripheral dimension of the side wall 36 is smaller than the inner peripheral wall surface of the upstanding bead 22 so as to be readily received therein, while the inner peripheral measurement of the side wall 36 is greater than the exterior peripheral dimension of the lower side wall 28 to reduce the dimensional differences between the upstanding peripheral bead 22 and the lower side wall 28 on the upper and lower ends of a pair of superposed containers. By reducing the dimensional differences in this manner, relative lateral shifting of the uppermost and lowermost container in a pair of superposed containers will be restricted. In its preferred form, the thickness of the side walls 36 is such that it will substantially prevent or hinder lateral shifting of the containers without interfering with unimpeded placement and removal from the packaging device.

Intermediate adjacent container receiving pockets are connecting generally planar web sections 40 which serve to rigidify side walls 36 on opposite sides thereof. The width of these sections 40 determines the distance which the side walls 24 of adjacent containers are spaced from one another. To aid in spacing adjacent containers above and below the packaging device 30 from each other, additional separating projections 42 shown in the phantom lines in FIG. 2 of the drawings may be provided as illustrated. These separating projections 42 may extend alternately above and below the plane of the sheet 30 or may each be designed to extend above and below the plane of the sheet to space upper and lower adjacent containers from each other.

Figure 4:
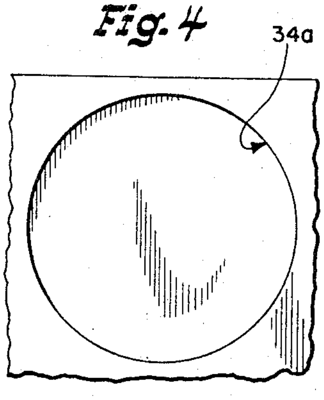
FIGS. 4–6 are enlarged fragmentary top plan views each illustrating modified forms of packaging devices coming within the purview of the present invention.
Figure 5:
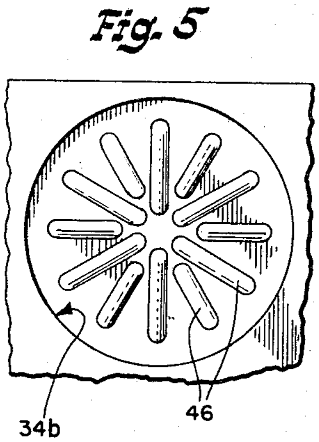
Figure 6:
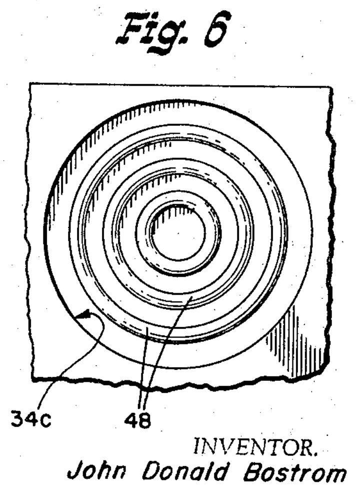

It will be noted that the bottom wall portion 38 in FIG. 3 of the drawings has an upwardly directed central disc portion 44 which conforms to the axially and upwardly concave bottom wall of the containers 20. Other variations for the bottom wall portions 38 are contemplated, and this is illustrated in FIGS. 4–6 of the drawings wherein identical reference numerals with the suffixes "a" through "c" respectively are employed to designate like parts. For example, the bottom wall portion may be entirely eliminated, and this is depicted by the modified pockets **34*a* illustrated in FIG. 4 of the drawings. In other cases, cushioning elements in the form of radially directed prongs or finger elements 46 as shown in the modified pocket 34*b* of FIG. 5 or concentric rings 48 as depicted in the modified pocket 34*c* of FIG. 6 may be provided to absorb shock imposed upon the superposed containers in a direction generally aligned with the axes thereof. The prongs 46 or rings 48** may either be upwardly or downwardly directed as desired, either variation being sufficient to suit the purpose of absorbing shock imposed on the containers during handling thereof such as would occur in a shipping carton.

Figures 7, 8:
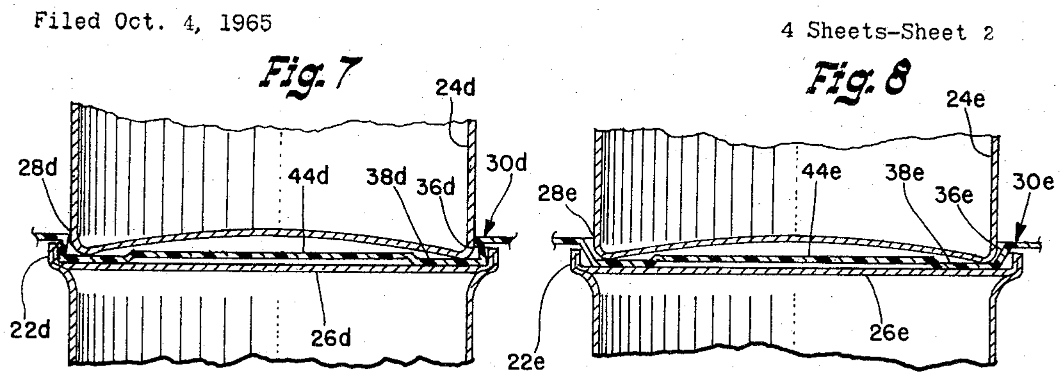
FIGS. 7–8 are enlarged sectional views each illustrating a pair of superposed containers separated from one another by other modified forms of packaging devices within the scope of the teachings disclosed herein.

Reference is now made to FIGS. 7–8 for a description of two further modified forms of packaging device. The packaging devices shown in FIGS. 7–8 are generally similar to the FIGS. 1–3 embodiment as indicated by the application of identical reference numerals with the suffixes "*d*" and "*e*" employed respectively to designate like parts in each of the embodiments. The only differences in the FIGS. 7 and 8 embodiments as compared with what is shown in FIGS. 1–3 is the relative inclination of the side walls **36*d*, 36*e* respectively which form part of each downwardly extending pocket in the devices 30*d*, 30*e* respectively. In FIG. 7, the side wall 36*d* is upwardly and inwardly inclined relative to the bottom wall 38*d* whereas in FIG. 8, the side wall 36*e* is upwardly and outwardly inclined relative to the bottom wall portion 38*e*. It will be recognized that the arrangement of FIG. 7 will enable the dimensional difference between the lower side wall surface 28*d* and the inner peripheral surface of the upstanding bead 22*d* to be completely eliminated, while the upward and outward inclination of the side wall 36*e*** will only partially reduce the dimensional difference unless its thickness is increased or it is provided with nibs, protuberances or the like which reduce the dimensional difference.

Figures 9, 10:
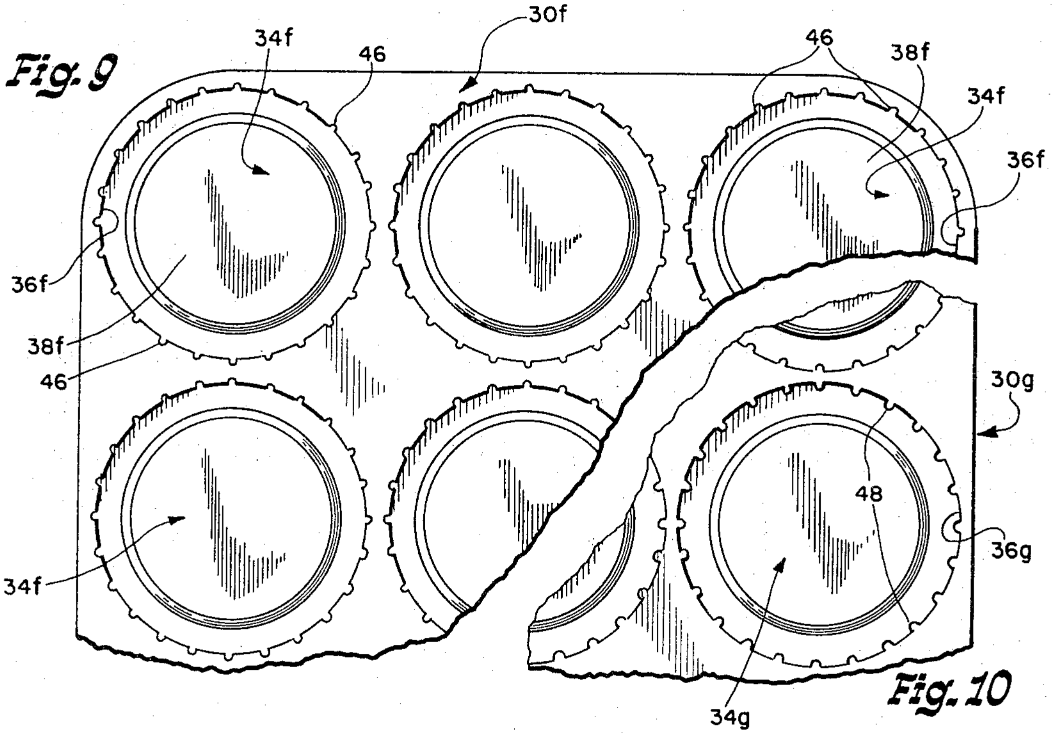
FIG. 9 is an enlarged fragmentary top plan view of yet still another modified form of packaging device which may be constructed in accordance with the teachings of the present invention.
FIG. 10 is also an enlarged fragmentary top plan view similar to the FIG. 9 embodiment, but varying therefrom to illustrate yet still another modified form of packaging device.
Figure 11:
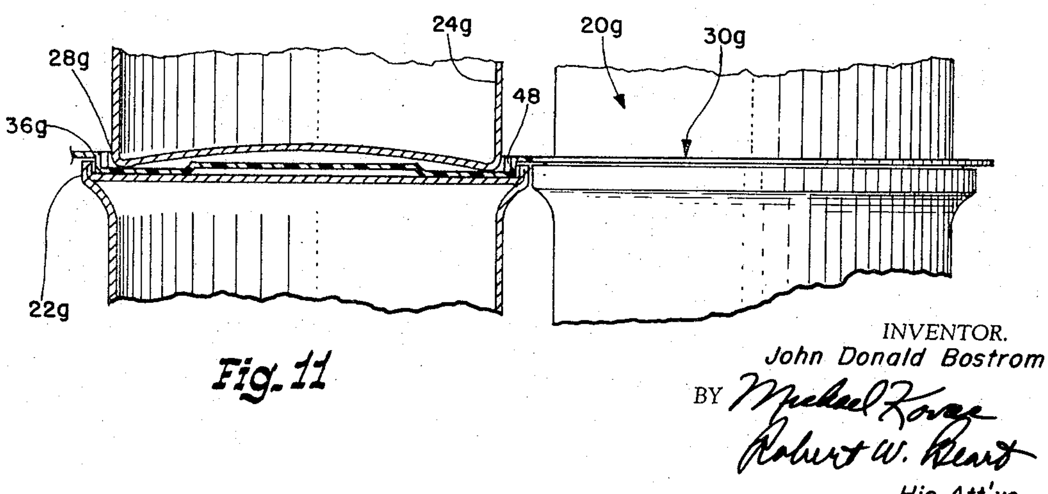
FIG. 11 is an enlarged fragmentary side elevational view, partly in section, illustrating a plurality of pairs of superposed containers separated from one another by a packaging device constructed as shown in FIG. 10 of the drawings.

FIGS. 9–11 illustrate two further embodiments of the present invention, FIG. 9 illustrating one form, and FIGS. 10–11 illustrating the other. Each of these modified forms employs radially outwardly or inwardly directed spaced protuberances which not only eliminate the dimensional difference between the smooth lower wall surfaces of the uppermost container and the inner peripheral measurement of the upstanding bead in the lowermost container of a pair of superposed containers, but will afford cushioning, much in the same way as the prongs or rings 46, 48 in the FIGS. 5–6 embodiments, to absorb shock imposed on the superposed containers in directions substantially normal to the axes thereof. More particularly, it will be seen that the packaging device 30*f* illustrated in FIG. 9 includes a series of outwardly directed spaced protuberances 46 which are formed on the side wall 36*f* of each downwardly extending pocket 34*f* between the uppermost planar section of the sheet and the bottom wall portion 38*f* of each pocket. The packaging device 30*g* in FIG. 10 of the drawings is formed with radially inwardly directed spaced protuberances 48 also in the side wall 36*g* of each downwardly extending pocket 34*g*.

Reference to FIG. 11 will indicate the manner in which the packaging device 30*g* is used with a plurality of pairs of superposed containers, it being recognized that the packaging device 30*f* will operate in substantially the same manner differing only in the various portions of the containers which the spaced protuberances 46 will engage. In FIG. 11, it will be seen that the inwardly directed, spaced protuberances 48 are designed to engage the lower side wall surface 28*g* of the uppermost container in each pair of superposed containers while the outer surface area of the side wall 30*g* rests and abuts against the inner peripheral surface of the upstanding peripheral bead 22*g*. There is no snug or tight fit of the containers in the pockets of the package device 30*g*, but rather a sliding engagement therewith so as to facilitate unimpeded placement and removal of the containers relative to the packaging device while preventing relative shifting of each pair of superposed containers and adjacent pairs of superposed containers relative to one another. Any force or shock imposed upon the containers 20*g* in a direction substantially normal to the axes thereof will be absorbed by the protuberances 48 which thus serve as cushioning means between the upper and lower ends of superposed containers.

Figure 12:
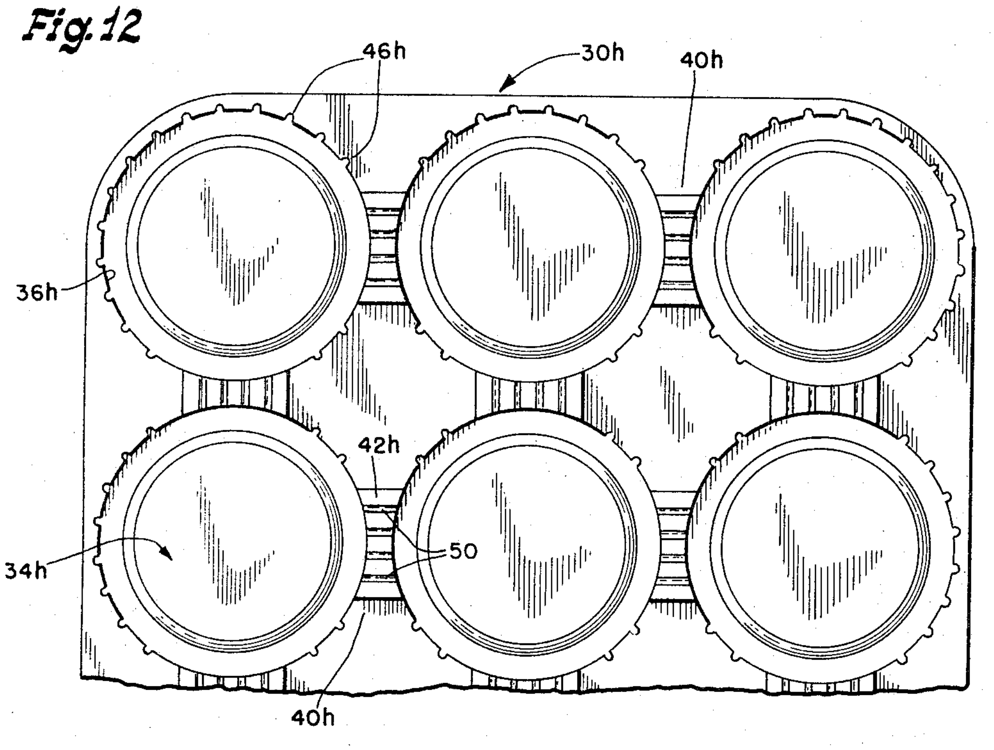
FIG. 12 is an enlarged fragmentary top plan view of a modified form of packaging device similar to the FIGS. 9–10 embodiments, but differing therefrom in several particulars.
Figure 13:
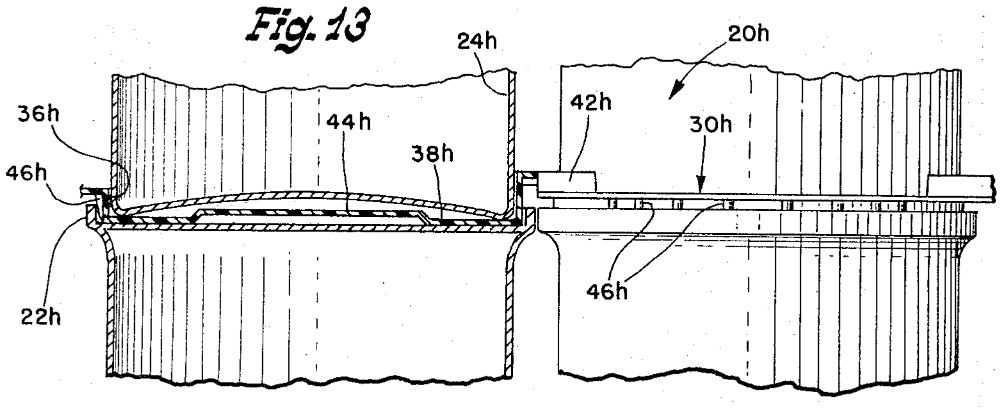
FIG. 13 is an enlarged fragmentary side elevational view, partly in section, of a plurality of pairs of superposed containers which are stacked and separated from one another by the packaging device shown in FIG. 12.

The embodiment shown in FIGS. 12–13 is generally similar to the above described embodiment as indicated by the application of identical reference numerals with the suffix "*h*" employed to designate like parts. This embodiment is most similar to that shown in FIG. 9 in that there are radially outwardly directed spaced protuberances 46*h* formed in the side wall 36*h* of each downwardly extending pocket 34*h*; however, in addition to this, there is provided between adjacent pockets 34*h* an upwardly extending separating projecting 42*h* each having a series of transversely extending grooves 50 which sub-divide each of the separating projections 42*h* in a plurality of parts to rigidify the consrtuction of the same. It will be noted that each of the separating projections 42*h* is formed generally in the vicinity of the connecting web sections 40*h*, and since the width of these sections 48 is preferably relatively small, the separating projections 42*h* have been strengthened such that they will be readily capable of maintaining the containers in the upper layer predetermined distances from each other. As has been indicated above, downwardly extending separating projections may be formed, for example, as shown in the phantom lines in FIG. 2 of the drawings such that the lower layer of containers in the superposed pairs of containers will also be positioned predetermined distances from each other.

The preceding discussion has centered primarily on containers of the type having a single beaded rim or enlargement, preferably at the upper end thereof; however, it will be understood that containers having upper and lower beaded rims can also be mounted within a modified package device now to be discussed. FIGS. 14–18 are modified forms of the present invention which illustrate various types of packaging devices usable with containers having upper and lower beaded rims, the packaging devices being similar in most respects to the ones previously discussed as indicated by the application of identical reference numerals with the suffixies "*i*" through "*k*" employed to designate corresponding parts.

Figures 14, 15:
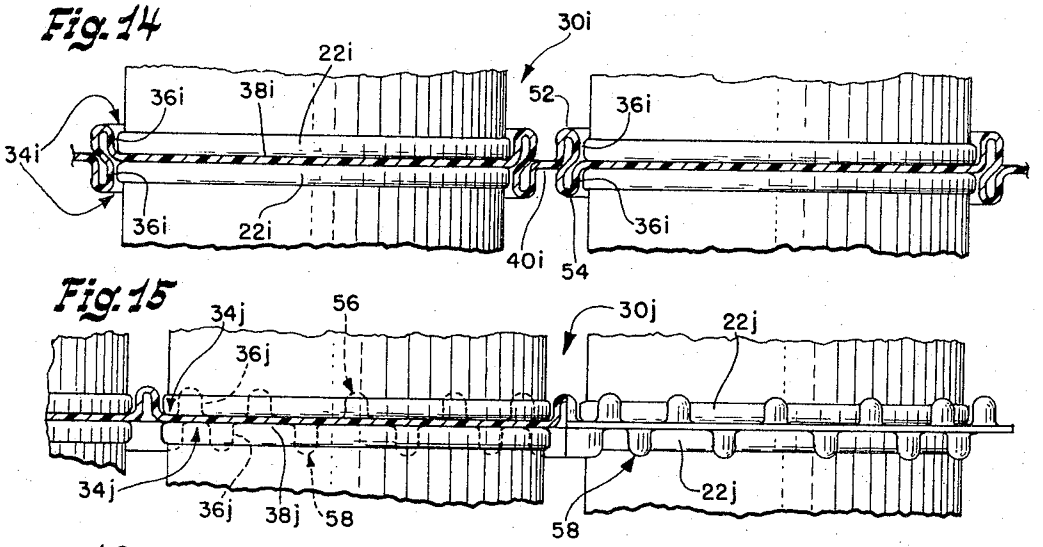
FIG. 14 is a sectional view of a plurality of pairs of superposed containers separated from each other by a further modified form of packaging device.
FIG. 15 is a fragmentary side elevational view, partly in section, of a plurality of pairs of superposed containers with a still further modified form of packaging device positioned between upper and lower containers.

In the FIG. 14 embodiment, the packaging device 30*i* includes a pair of generally opposed, container receiving pockets 34*i*, as compared with the single container receiving pockets in FIGS. 1–13, which are used with each pair of superposed containers. This modification is necessary to accommodate superposed containers having upper and lower beaded rims 22*i*, 22*i* as seen in FIG. 14. Each container receiving pocket 34*i* includes a separate side wall 36*i* and a common bottom wall portion 38*i*. The side wall 36*i* in the uppermost container receiving pocket 34*i* is joined to the lowermost side wall 36*i* of the subjacent container receiving pockets by a reversely curving wall portion 52, the lowermost side wall portion 36*i* being integrally connected to the connecting web area 40*i* also by a reversely curving wall portion designated 54. The arrangement of the parts is such that the side wall portions 36*i* in the upper and lower container receiving pockets 34*i* substantially hinder or restrict lateral shifting of a pair of superposed containers, while also serving as a cushioning means, due to the configuration and placement of the reversely curving wall portions 52, 54, to absorb any shock imposed upon the containers in a direction substantially normal to the axes thereof.

Figure 16:
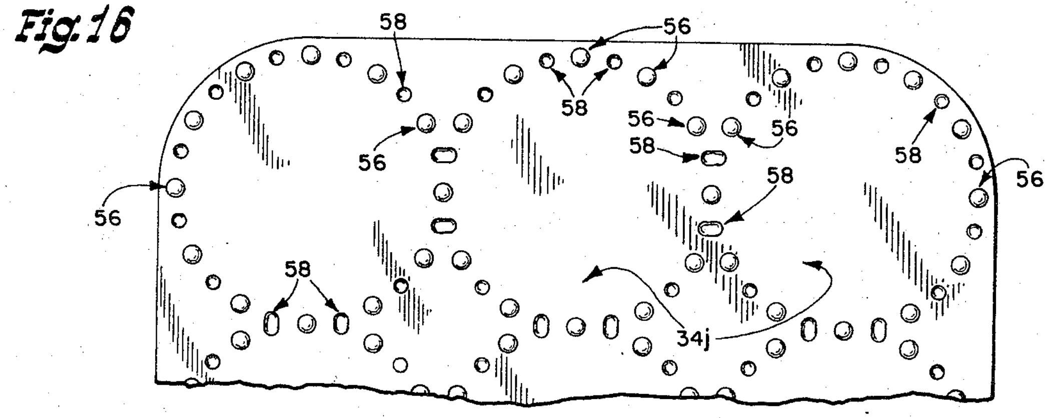
FIG. 16 is a fragmentary top plan view of the packaging device shown in FIG. 15.

The modified packaging device 30*j* shown in FIGS. 15–16 also includes generally opposed upper and lower container receiving pockets 34*j*, but in this form, the side wall portions 36*j* are circumferentially interrupted to provide an alternating series of upwardly and downwardly extending hollow nibs 56, 58 respectively which are perhaps best seen by the planar arrangement shown in FIG. 16. The inner peripheral measurement of the nibs 56, 58 is slightly larger than the external peripheral dimension of the upper and lower beaded rims 22*j*, 22*j* such that upper and lower superposed containers can readily be received therewithin. Also, due to the hollow construction of the nibs 56, 58, they will readily serve as a shock absorbing means to cushion the containers against any undersirable forces which tend to rock or move the containers out of the generally opposed pockets 34*j* in much the same mannerr as the other embodiments.

It is to be further noted that this alternating series of upwardly and downwardly extending hollow nibs 56, 58 respectively can be arranged in a suitable fashion to reduce the spacing between juxtaposed pairs of superposed containers. More particularly, it will be seen in FIG. 16 of the drawings that adjacent pairs of generally opposed pockets 34*j* can be positioned in close proximity to one another to enable several of the upwardly and downwardly projecting nibs 56, 58 respectively to serve adjacent, generally opposed container pockets 34*j* in an area of tangency therebetween. All of this can readily be accomplished without sacrificing the cushioning effect provided by the nibs.

Figures 17, 18:
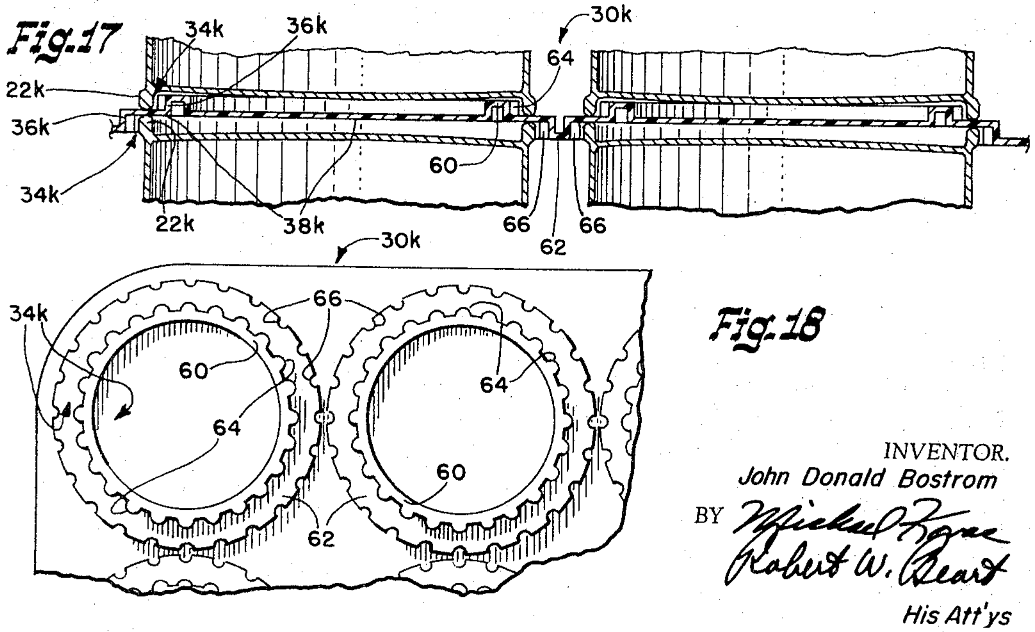
FIG. 17 is a fragmentary sectional view similar to FIG. 14, but showing yet still a further modified form of packaging device separating a plurality of pairs of superposed containers from each other.
FIG. 18 is a fragmentary top plan view of the form of packaging device shown in FIG. 17.

Reference is now made to FIGS. 17–18 for the last embodiment of the present invention illustrated in the drawings. There it will be seen that the packaging device 30*k* also includes generally opposed, upper and lower container receiving pockets 34*j* which, in this embodiment, are slightly altered in form. More specifically, it will be seen that each lowermost pocket 34*k* is generally of the type previously discussed in that it comprises a surrounding wall structure relative to the container bead 22*k* whereas the uppermost container receiving pocket 34*k* includes an internal wall structure which itself is surrounded by the lower beaded end rim 22*k* provided on the upper container in a pair of superposed containers. This is accomplished by forming radially offset upwardly and downwardly extending side wall portions 36*k* which are integrally joined to each other by a segment of the bottom wall portion 38*k*. The upper side wall 36*k* is part of an axially directed annular rib 60 while the lower side wall portion constitutes a part of the axially directed, lower annular rib 62.

To enhance the shock absorbing capabilities of the upwardly and downwardly extending annular ribs 60, 62 respectively, a plurality of generally radially extending nodules 64, 66 are provided, and are closely analogous to the spaced protuberances 46, 48 provided in the FIGS. 9 and 10 embodiment. The nodules which are integrally associated with the annnular rib 60 are designated 64 while the nodules extending from the lower annular rib 62 are designated 66. The nodules 64, 66 act in the same manner as the protuberances 46, 48 respectively of the FIGS. 9 and 10 embodiments to absorb shock imposed upon superposed containers in a direction substantially normal to the axes thereof to prevent inadvertent displacement of the containers relative to each of the generally opposed pockets 34*k*.

From the foregoing, it will now be appreciated that the present invention discloses a new and improved container stacking and separating device for a plurality of pairs of superposed containers. The device enables such containers to be arranged in relatively close, non-engaging positions to conserve space while preventing any damage to the containers which arises through handling thereof. While retained within the stacking and separating device, the containers are securely held in their respective positions even when subject to shock which might cause inadvertent displacement of the containers relative to the device or physical damage to the containers themselves. It will also be appreciated that the stacking and separating device will facilitate initial displacement and subsequent removal of superposed containers without sacrificing either container retention or shock absorbing capabilities. Along with the foregoing advantages, the relative ease by which such stacking and separating devices can be readily interposed between as well as removed from superposed containers, the adaptability of such devices to both shipping cartons and store displays, and the comparable economic cost of such devices give them marked and superior results over that which has been attained by prior art devices.

Although specific embodiments have been shown and described, it is with full awareness that many modifications thereof are possible. The invention, therefore, is not to be restricted except by the prior art and by the spirit of the appended claims.

What is claimed is:

1. A packaging device for a plurality of pairs of superposed one-piece container bodies each having an axially and radially projecting bead adjacent its upper end connected to a top element, each of the radially projecting beads being of sufficient axial height and peripheral measurement to readily receive the lower end of a similarly configured container body therein, said device comprising an elongated substantially flat body member formed from thermoplastic sheet material adapted to be interposed between each pair of superposed container bodies and having container receiving means for accepting upper and lower ends of each pair of superposed container bodies, said container receiving means including a downwardly projecting pocket having a bottom wall portion to prevent engagement of the end wall surfaces of each pair of superposed container bodies, and a side wall portion extending between an outer wall surface adjacent the lower end of an uppermost container body and an inner peripheral surface of the axially and radially projecting bead on the lowermost container body in each pair of superposed container bodies, and cushioning means provided in the side wall portion which, together with the diametrical extent of the side wall portion of the downwardly projecting pocket, is sufficient to engage the outer wall surface adjacent the lower end of an uppermost container body and the inner peripheral surface of the axially and radially projecting bead on a lowermost container body in each pair of superposed container bodies while absorbing lateral shock imposed on said superposed container bodies in a direction substantially normal to the axes thereof.

2. The packaging device as set forth in claim 1 wherein said cushioning means comprises a plurality of peripherally spaced protuberances which are radially offset from the side wall portion of the downwardly projecting pocket.

3. The packaging device as set forth in claim 1 wherein each bottom wall portion includes cushioning means for absorbing shock imposed on said container bodies in a generally axial direction.

References Cited

UNITED STATES PATENTS

| | | | |
|---|---|---|---|
| 1,757,192 | 5/1930 | Hothersall | 220—20 |
| 2,063,319 | 12/1936 | Lee | 206—65 |
| 2,215,252 | 9/1940 | Randall et al. | 229—42 X |
| 2,704,600 | 3/1955 | Despres | 217—26.5 X |
| 2,766,891 | 10/1956 | Elzer | 220—97 |
| 2,965,226 | 12/1960 | Ettlinger | 206—65 X |

FOREIGN PATENTS

| | | |
|---|---|---|
| 938,683 | 10/1963 | Great Britain. |

DAVIS T. MOORHEAD, *Primary Examiner*